Figure 1:
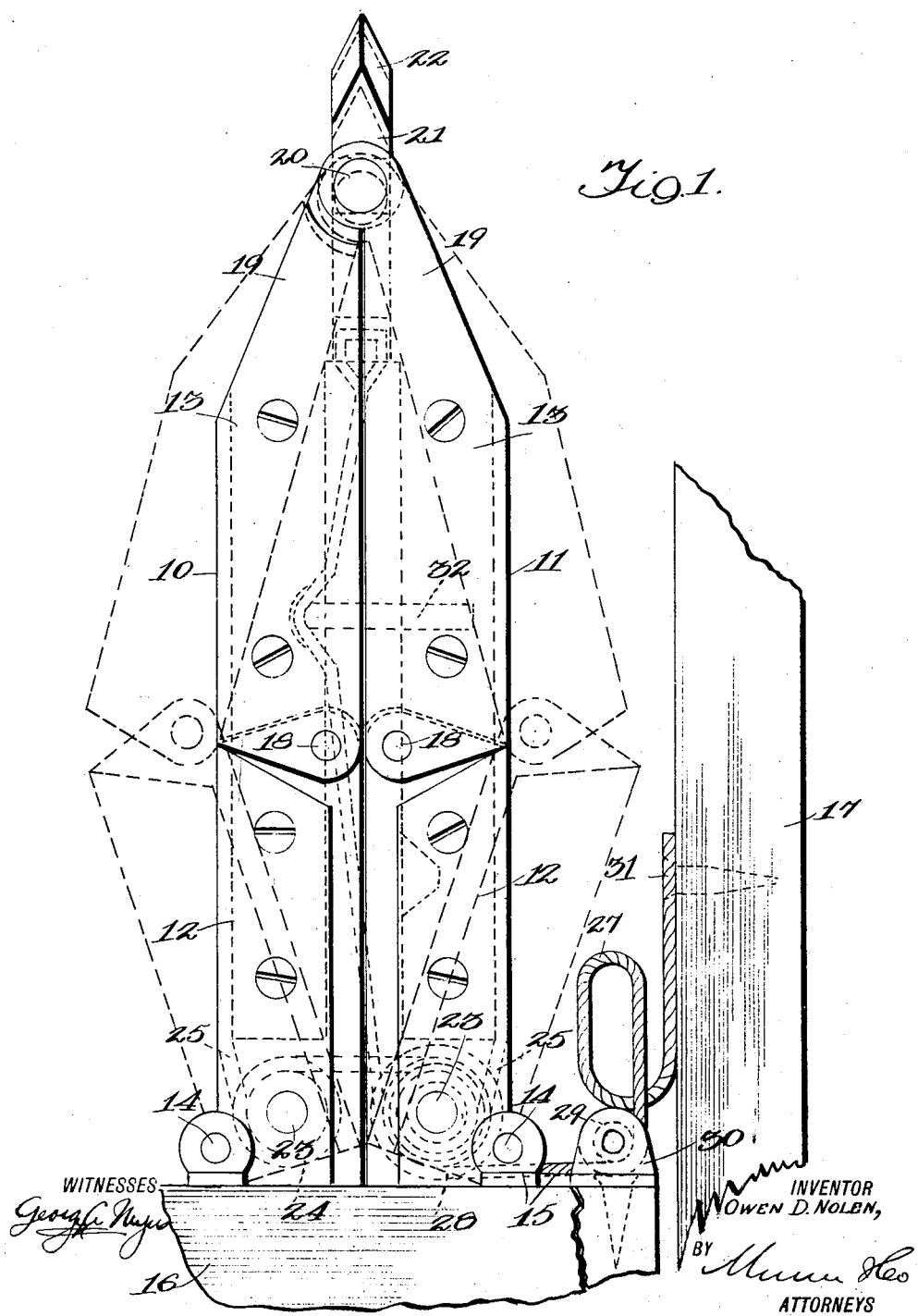

O. D. NOLEN.
HAY PERFORATING DEVICE.
APPLICATION FILED JAN. 10, 1920.

1,376,568.

Patented May 3, 1921.
2 SHEETS—SHEET 1.

WITNESSES

INVENTOR
Owen D. Nolen,
BY
ATTORNEYS

O. D. NOLEN.
HAY PERFORATING DEVICE.
APPLICATION FILED JAN. 10, 1920.
1,376,568.
Patented May 3, 1921.
2 SHEETS—SHEET 2.
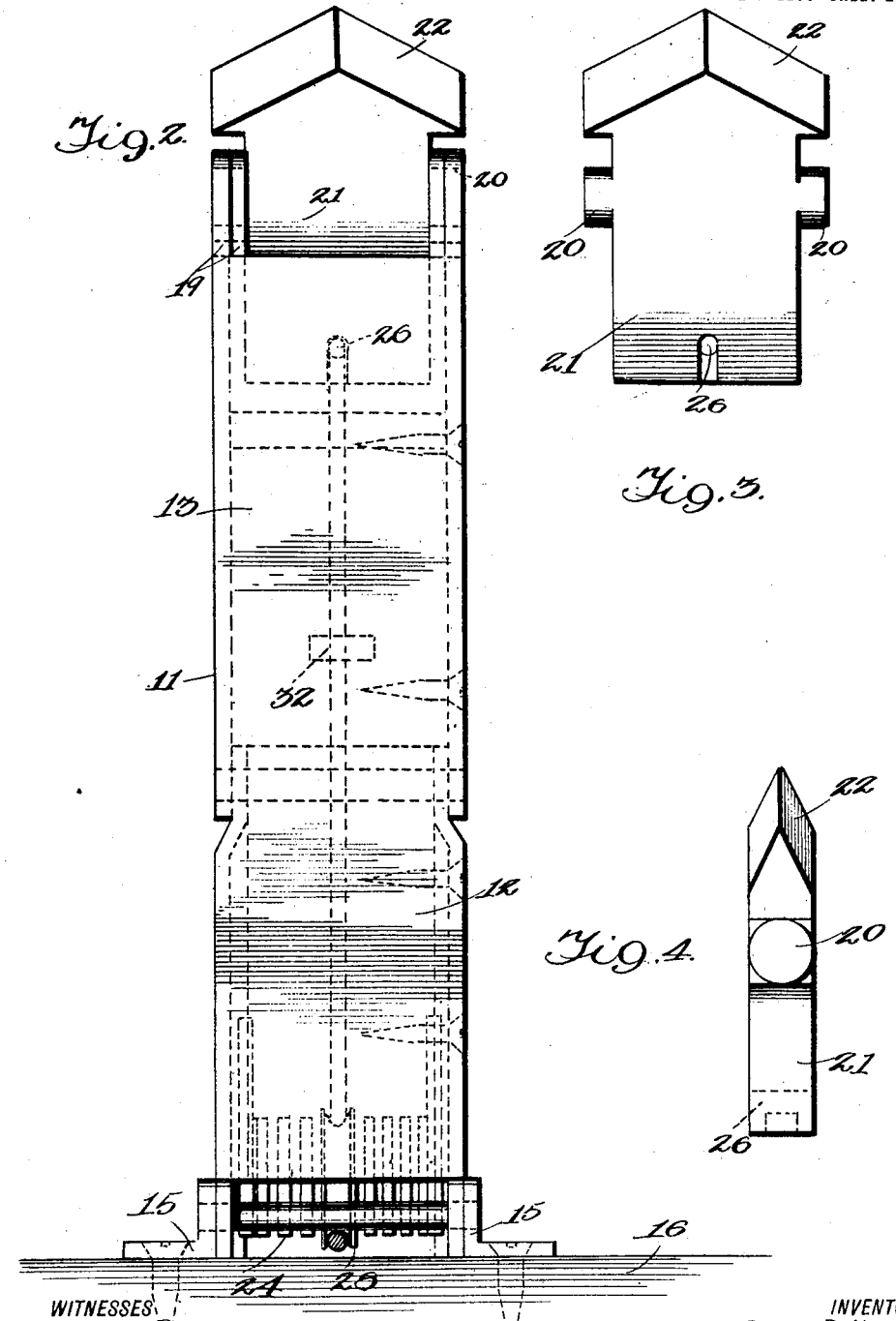
INVENTOR
OWEN D. NOLEN,
BY
ATTORNEYS
WITNESSES

UNITED STATES PATENT OFFICE.

OWEN D. NOLEN, OF LEBANON, TENNESSEE.

HAY-PERFORATING DEVICE.

1,376,568. Specification of Letters Patent. Patented May 3, 1921.

Application filed January 10, 1920. Serial No. 350,666.

*To all whom it may concern:*

Be it known that I, OWEN DOWELL NOLEN, a citizen of the United States, and a resident of Lebanon, in the county of Wilson and State of Tennessee, have invented certain new and useful Improvements in Hay-Perforating Devices, of which the following is a specification.

My present invention relates generally to hay perforating devices, or to be more particular, to bale perforating devices by which hay is perforated as it is baled, an opening being formed centrally through the bale in order to provide for access of air to the center of a bale and in this way defeat molding from moisture.

Devices of this general nature are shown in Patents 970,930 and 1,045,125 respectively granted to Boaz Kingham under date of Sept. 20th, 1910, and Joseph Dain, under date of Nov. 26th, 1912, and as indicated by these patents, a perforating device of this nature is commonly carried upon the baling head or plunger and requires a special construction thereof in order that sufficient space be left free when the baling head is retracted for a new charge of hay as well as for free inward and outward movement of the feeder.

The primary object of my present improvement is the provision of an arrangement capable of attachment to the baling head of an ordinary baling press now in use, which will admit of the above and which for this purpose is of a foldable nature, with means for folding the same against the baling head during retractile movement of the latter.

In the accompanying drawings which illustrate my present invention and form a part of this specification:—

Figure 1 is a plan view of my improvements showing portions of the baling head and the press frame to which my improvements are attached, Fig. 2 is a side elevation of my improvements and, Figs. 3 and 4 are respectively a side and edge view of the knife head of the perforator.

Referring now to these figures, my improved perforator includes two side members 10 and 11, each of which includes an inner section 12 and an outer section 13. Each of these sections is generally U-shaped and each inner section is hingedly mounted at the outer side of its inner end upon a pivot pin 14 supported in brackets 15 attached to the bale head 16 of a bale press, a portion of one side wall of the frame of which appears at 17 in Fig. 1.

Thus the two inner sections 12 of the side members, are normally extended in parallel relation at right angles to the baling head 16, and are yieldable at their outer portions away from one another upon their inner hinges upon the pivot pins 14. The outer sections 13 of each side member are hingedly connected at the inner portions of their inner ends to the inner portions of the outer ends of the inner sections 12, by pivot pins 18 for which purpose the outer portions of the side walls of the inner sections 12 are offset inwardly as particularly seen in Fig. 2, so as to be lapped by the inner portions of the side walls of the outer sections 13.

The outer sections 13 of the two side members have tapering outer ends 19, the extremities of which are lapped and connected by pivot pins 20, the latter being in the form of trunnions projecting from the side edges of a perforating knife whose shank or body 21 extends inwardly some distance between the sections 13 and the outer end beyond the extremities of the side outer sections, has a sharpened spear shaped connecting point 22.

Adjacent to their inner ends, the inner sections 12 have transverse pins 23 around which are coiled portions of a heavy spring 24, whose ends 25 bear against the inner surfaces of the inner sections 13 and tend to hold the parts in the outstanding parallel effective position shown.

The inner end of the shank or body of the perforator knife is however provided with a central transverse opening 26 adapted to receive one end of a flexible connection for instance in the form of a wire rope 27 which extends inwardly between the two side members and around a pulley 28 upon the pin 23 of one of the side members and outwardly around a guide pulley 29 mounted in a bracket 30 attached to one side of the baling head 16, the opposite free end of the connection 27 being secured at 31 to one side wall 17 of the baling press.

One of the side members, namely the member 11 is also preferably provided with a transversely disposed engaging member 32, as seen particularly in Fig. 1, the free end of which extends into the opposite member when the parts are in the effective position shown in order to engage the connection 27 intermediate its ends and provide a bearing for the same.

In attaching the perforator to a baling press, and it is obvious that it is capable of ready attachment to baling presses now in use, sufficient slack is left in the wire rope or connection 27 so that there will be no pull thereon until the baling head 16 has covered approximately one-half (1/2) of its retractile movement the pressure being such by virtue of the connection of the wire rope to the side wall of the press frame as to pull inwardly against the outer ends of the side members 10 and 11 and at the same time press outwardly against the bearing member 32 of the outer section of one of these members. The result is to cause the two members to flex away from one another at their central portions upon the pivot pins 18 connecting their sections, the outer ends of the outer sections working on the pivot pins 20 and the inner ends of the inner sections working on the pivot pins 14. This movement tends to fold the sections of each side member upon one another toward the baling head and against the tension of spring 24 so that in retracted position of the baling head and any position between the retracted position and a half-way advanced position, the perforator will be more or less folded to provide for the reception of a new charge of hay in the baling process and the free inward and outward movement of the usual feeder.

In operation, upon each advancing movement of the baling head 16, the perforator will be again in its normal effective outstanding position and will commence its movement to such position by the time the baling head has advanced half-way so as to be ready during the further movement of the baling head to pass into and form an opening within the hay comprising the bale. The cutter at the outer end of the perforator facilitates its movemnt into the hay bale and the tapering outer construction of the outer sections 13 as previously described, permits the perforator to readily pass into the opening or cut made by the cutter.

It is thus obvious that my invention is capable of ready application to and operation with bale presses as commonly constructed and as now in use and that in addition to this, my invention proposes a simple inexpensive construction which is capable of effective and efficient action and will be lasting and durable in use.

I claim:—

1. The combination with a bale press, including a frame, and a movable plunger or baling head, of a hay perforator mounted on the baling head, comprising flexibly connected foldable sections yieldable toward and away from the baling head, and means connected to the perforator and to a portion of the frame of the press for controlling folding movement of the perforator during movement of the baling head.

2. The combination with a bale press, including a frame, and a movable plunger or baling head, of a hay perforator mounted on the baling head, comprising spring controlled portions yieldable toward and away from the baling head, and flexible connections leading from said yieldable portions to portions of the frame of the press for controlling the perforator during movement of the baling head.

3. The combination with a bale press, including a frame, and a movable plunger or baling head, of a hay perforator mounted on the baling head, comprising side members, each including hingedly connected sections, said side members being pivotally connected to one another at their outer ends and having pivotal connections at their inner ends to the baling head, a spring normally holding the said members in parallel outstanding relation and a flexible member connected at one end to the said side members and at its opposite end to a portion of the frame of the press, as and for the purpose described.

4. A perforator of the character described comprising a pair of side members pivotally connected to one another at their outer ends, a cutter supported in the outer ends of the side members, each of said side members including inner and outer sections hingedly connected to one another to permit of folding of the side members, a flexible connection secured to the cutter and extending inwardly between the said members, a pulley carried by one of said members and forming a guide for said flexible connection, pivot supports for the inner ends of the said side members and a spring engaging the said members adjacent to their inner ends to tension folding movement thereof and to normally maintain the same in parallel outstanding relation.

OWEN D. NOLEN.